United States Patent [19]

Suganuma et al.

[11] Patent Number: 5,261,018
[45] Date of Patent: Nov. 9, 1993

[54] OPTICAL-COUPLER REINFORCING MATERIAL AND OPTICAL-COUPLER REINFORCING METHOD

[75] Inventors: Hiroshi Suganuma; Tomoyuki Hattori; Junichi Yoshikawa; Hiroaki Takimoto; Hiroshi Yokota, all of Kanagawa; Nobuo Tomita, Ibaraki; Kazuhiko Arimoto, Tokyo, all of Japan

[73] Assignees: Sumitomo Electric Industries, Ltd., Osaka; Nippon Telegraph & Telephone Corporation; Sumiden Opcom, Ltd., both of Tokyo, all of Japan

[21] Appl. No.: 840,891

[22] Filed: Feb. 26, 1992

[30] Foreign Application Priority Data

Feb. 27, 1991 [JP] Japan ............... 3-32789

[51] Int. Cl.$^5$ .................................... G02B 6/44
[52] U.S. Cl. ............................... 385/51; 385/99
[58] Field of Search ................. 385/99, 95, 96, 51

[56] References Cited

U.S. PATENT DOCUMENTS

| 4,509,820 | 4/1985 | Murata et al. | 385/99 |
| 4,746,189 | 5/1988 | Arrington et al. | 385/99 |
| 4,810,277 | 3/1989 | Waitl et al. | 395/99 |
| 4,863,234 | 9/1989 | Gladenbeck et al. | 385/99 |
| 5,066,095 | 11/1991 | Dekeyser et al. | 385/99 |

FOREIGN PATENT DOCUMENTS

| 0124927 | 11/1984 | European Pat. Off. . |
| 0272112 | 6/1988 | European Pat. Off. . |
| 2193342 | 2/1988 | United Kingdom . |

OTHER PUBLICATIONS

Uberbacher, "*Field Installable Optical Fiber Connector*", IBM Technical Disclosure Bulletin, Jun. 1982, vol. 25, p. 402.
Patent Abstract of Japan JP-60-179483, vol. 10 No. 28 "Nippon Denshin Denwa Kosha" Sep. 13, 1985.
Patent Abstract of Japan JP10-63907, vol. 13, No. 271, "Furukawa Electric Co., Ltd." Sep. 3, 1989.

Primary Examiner—Frank Gonzalez
Attorney, Agent, or Firm—Cushman, Darby & Cushman

[57] ABSTRACT

The invention provides an optical-coupler reinforcing member for fixing and reinforcing a fiber-coupler body and a method of performing the reinforcing. The reinforcing member includes heat-shrinkage tubes which are shrunk by heating, and a hollow protection pipe provided in the heat-shrinkage tubes. Cylindrical heat-fusible adhesive members are provided on opposite ends of the protection pipe, and heating is made such that a fusing portion of an optical-fiber coupler body is inserted through the reinforcing member so that the heat-fusible adhesive members and the heat-shrinkage tubes are shrunk by heating to thereby fix and reinforce the optical coupler body.

12 Claims, 2 Drawing Sheets

OPTICAL-COUPLER REINFORCING MATERIAL AND OPTICAL-COUPLER REINFORCING METHOD

BACKGROUND OF THE INVENTION

1. Field of Invention

The present invention relates to an optical-coupler reinforcing member and an optical-coupler reinforcing method.

2. Description of Related Art

Generally, an optical-fiber coupler is produced through a process in which an optical-fiber coupler body formed by melt-drawing is fixed by using a fixing member having substantially the same coefficient of linear expansion as that of a quartz optical fiber. FIG. 4 (PRIOR ART) shows an example of the conventional optical-fiber coupler.

As shown in the drawing, an optical-fiber coupler body 103 having an optical-fiber tapered portion 102 in which optical fiber strands 101 are mutually fused is plate-like formed, and fixed so as to be sandwiched between a first and second fixing members 105 and 106 each having at its surface a groove portion 104 having a predetermined shape. The fixing method utilized is an adhesion method using, for example, an epoxy group adhesive or an ultraviolet-ray setting adhesive.

The optical-fiber coupler according to the foregoing prior art is fixed by using an adhesive which has provided for the following problems. The conventional method comprises melt-drawing optical fibers, making a quartz casing come into contact with the melt-drawn fibers, and application of an adhesive onto opposite end portions of the casing so as to integrate the quartz casing and the optical fibers with each other. This conventional method requires a separate step of application of the adhesive. Even the quickest setting adhesive requires a setting speed approximately 15 minutes. This step of applying and setting the adhesive makes the attachment of the reinforcing casing the slow step in the process; often slowing production.

This delay makes it crucial to further ensure protection against outside air or moisture from contaminating the attachment process after fixing of the plate-like protection member.

In the case of using an ultraviolet-ray setting adhesive, there is the further complication of utilizing expensive machinery such as an ultraviolet light source or the like.

In view of the foregoing, an object of the present invention is to provide an optical-coupler reinforcing member in which work is simplified and production and manufacturing time is shortened. Further, the present invention provides an optical-complex reinforcing member with improved strength and method for producing same.

SUMMARY OF THE INVENTION

In order to overcome the above problems, the structure of the optical-coupler reinforcing member according to the present invention is characterized in that cylindrical heat-fusible adhesive members are provided respectively on opposite ends of a hollow protection pipe and the respective outer circumferences of the protection pipe and the heat-fusible adhesive members are covered with a heat-shrinkage tube.

BRIEF DESCRIPTION OF THE DRAWINGS

In the accompanying drawings, the specific components are described in fuller detail by way of the DETAILED DESCRIPTION OF THE PREFERRED EMBODIMENTS.

DETAILED DESCRIPTION OF THE PREFERRED EMBODIMENTS

Our optical-coupler reinforcing member has cylindrical heat-fusible adhesive members provided at respective opposite ends of a hollow protection pipe. The respective outer circumferences of the protection pipe and the heat-fusible adhesive members are covered with a heat-shrinkage tube. An optical coupler constituted by mutually-fused optical-fiber strands is inserted through the hollow protection pipe of the optical-coupler reinforcing member so that an optical-fiber tapered portion of the optical coupler is disposed at the center of the protection pipe. The heat-fusible adhesive members and the heat-shrinkage tube of the optical-coupler reinforcing member are then heat-shrunk through heating by a heating means so that the optical coupler is thermally fixed at both sides of the optical-fiber tapered portion to thereby reinforce the optical coupler.

One embodiment of the present invention will be described in detail with reference to the drawings.

Figure 1A:
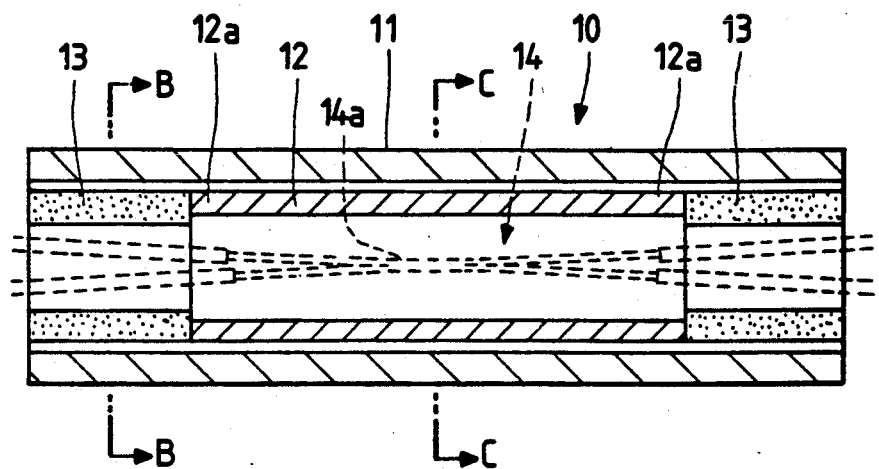
FIGS. 1A-1C are schematic sectional views showing an optical-coupler reinforcing member.
Figure 1B:
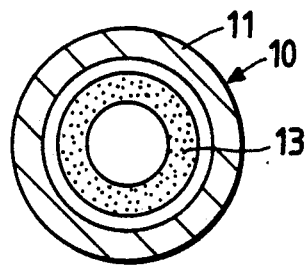
Figure 1C:
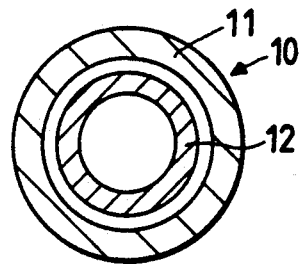

FIG. 1.(A), is a sectional view showing an optical-coupler reinforcing member, the FIG. 1.(B), is a sectional view taken on line B—B and viewed in the direction of the arrows in the FIG. 1.(A). FIG. 1.(C), is a sectional view taken on line C—C and viewed in the direction of the arrows in FIG. 1(A).

As shown in the drawings, an optical-coupler reinforcing member 10 is provided with a heat-shrinkage tube 11 which is shrinkable by heat, a hollow protection pipe 12, for example, of quartz glass, and cylindrical heat-fusible adhesive members 13 and 13 which are provided on opposite end portions 12a and 12a of the protection pipe 12 respectively and which are to be fused by heat so as to provide an adhering function.

The heat-shrinkage tube 11, comprises a hollow member which is shrunk completely at a low temperature of about 200° C., and, preferably a member having a heat shrinkage speed lower than a heat fusing speed of the heat-fusible adhesive member is employed.

Further, it is particularly preferable to use quartz glass for the protection pipe, 12, having the same quality of the material as that of an optical fiber. It is desirable, however, to use a material which has a different coefficient of linear expansion from quartz glass which is the material of an optical coupler. Such a difference is preferably not larger than $1 \times 10^{-4}$ so that the temperature characteristic of the coupler is kept within a satisfactory range.

Examples of suitable compositions for the heat-fusible adhesive member, 13, may include ethylene group copolymer resin (for example, ethylene vinyl acetate), a low-melting point metal, low melting point glass, wax, and the like. Further, it is most preferable to use such a material molded in the form of a cylindrical shape.

Figure 3:
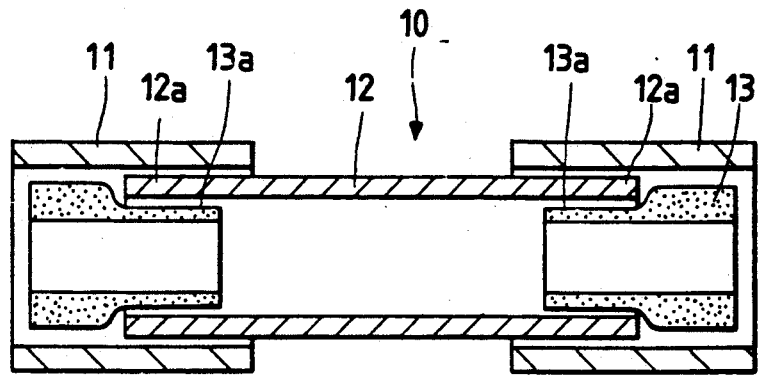
FIG. 3 is a schematic sectional view showing an optical-coupler reinforcing member.
Figure 4:
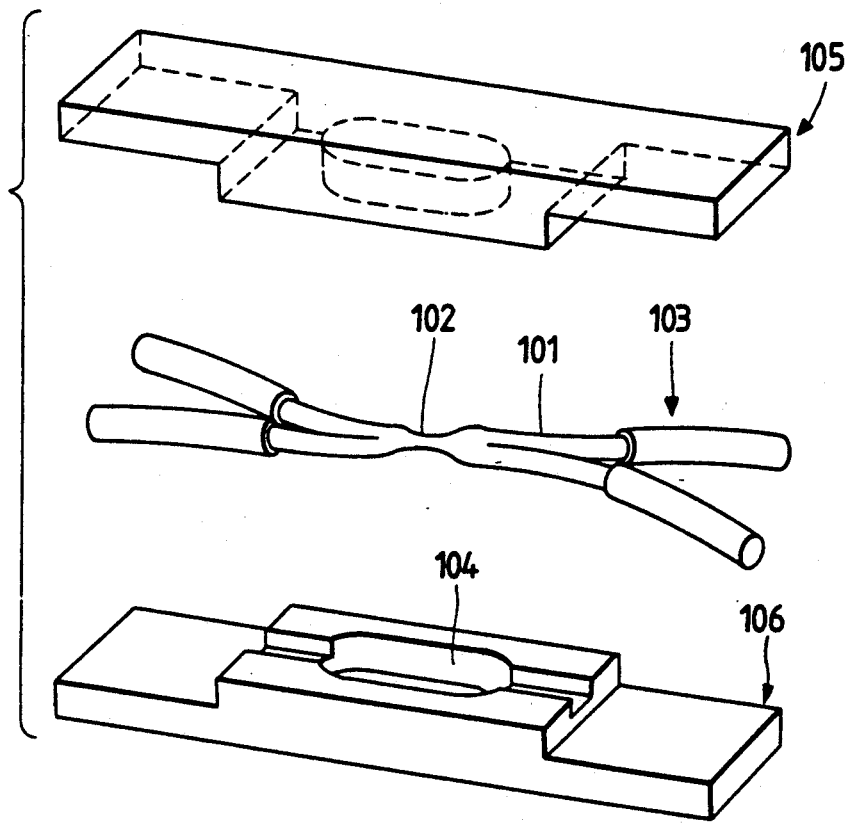
FIG. 4 (PRIOR ART) is a schematic view showing an optical-coupler fixing member according to the prior art.

FIG. 3 shows another embodiment of the optical-coupler reinforcing material of the present invention. In this configuration, end portions 13a and 13a of heat-fusible adhesive members 13 at the protection pipe side are inserted into opposite end portions 12a and 12a of a hollow protection pipe 12. Heat-shrinkage tubes 11 and 11 are provided so as to cover the protection pipe 12 and the heat-fusible adhesive members 13.

Figure 2:
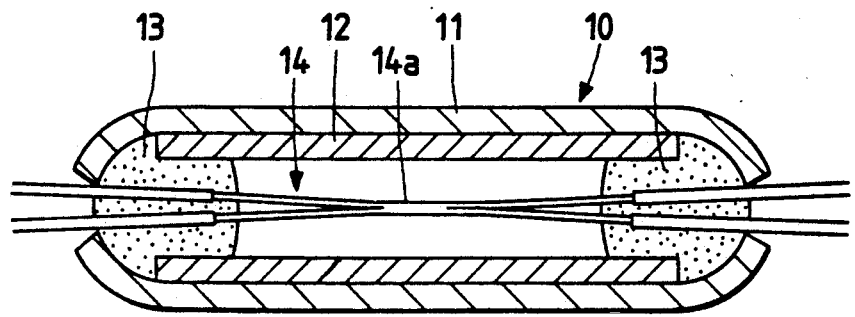
FIG. 2 is a schematic view showing the state where an optional-coupler body is fixed.

When an optical-fiber coupler is protected by using the configuration of this embodiment of the optical-coupler reinforcing member 10, the whole optical-coupler reinforcing member 10 is heated by heating means in the state where an optical-fiber coupler body 14 is inserted into the protection pipe 12 so that a fusing portion 14a of the body 14 is disposed at the central portion in the axial direction of the protection pipe 12 as shown in FIG. 2. As a result, the heat-fusible adhesive members 13 and 13 and the heat shrinkage tubes 11 are shrunk by heating so that the optical-fiber coupler body 14 is fixed to the reinforcing member 10.

The present invention is described in further detail in the following non-limiting Example.

In this example, in order to realize the same configuration as that of the optical-coupler reinforcing member of FIG. 1, a quartz pipe (having a length of 40 mm, an outer diameter of 4 mm, and a widthwise diameter of 2.0 mm) was used as the protection pipe, 12. A tube-like member of cylindrical ethylene vinyl acetate (having an outer diameter of 2.0 mm, an inner diameter of 1.0 mm, and a length of 15 mm) was used as the heat-fusible adhesive member, 13, to be provided on each of opposite end portions of the quartz pipe. At this time, a front end portion of the ethylene vinyl acetate was inserted to the position which is about 5 mm away from each of the opposite end portions of the quartz pipe. The quartz pipe and the ethyl vinyl acetate were covered with heat-shrinkage tubes (each having an outer diameter of 5.0 mm, an inner diameter of 4.0 mm, and a length of 60 mm) so that an optical-coupler reinforcing member, 10, was produced.

An optical-fiber coupler was inserted through the reinforcing material, 10, and heated so as to perform fixing. The heating was performed by using a plate-like ceramic heater, having a length of 60 mm, under the condition that the heating temperature was 180° C. and the heating time was 3 minutes. A time of 2 minutes was taken for cooling after fusion, and as a result the optical-fiber coupler could be fixed in the optical-coupler reinforcing member in 5 minutes total time. The production time according to the present invention was, therefore, largely reduced in comparison with the conventional method described above.

The present invention provides the following advantages over existing methods. Unlike the conventional case, it is not necessary to perform an extra production step of applying the adhesive because the adhesive members are provided on the optical-coupler reinforcing member in advance, thus providing for simplification of work as well as a reduction of working time.

Unlike the conventional method, the method of the present invention obviates the need for a separate operation to seal the casing after a coupler has been fixed to the casing because the protection pipe is covered with the heat-shrinkage tubes. Therefore, the heated protection pipe is perfectly sealed, and consequently these two conventional steps can be simultaneously performed as one step in the present invention so that the work can be simplified and the production and manufacturing time can be reduced.

Although an optical-fiber coupler is fixed to the reinforcing member by using heat-fusible adhesive members, and therefore it is necessary to perform heating by using a heating means such as an electric heater or the like for fusing the adhesive; it is not necessary in the present invention to use an expensive apparatus because the temperature required for the fusion is relatively low ($\sim 200°$ C.). The manufacturing time can be reduced because the fusion time is short ($\sim 3$ minutes).

Since an optical-fiber coupler body is fixed to the cylindrical protection pipe, the body is hardly influenced by vibration, pressure, or any temperature change from the outside, so that the characteristic of the optical-fiber coupler is stable.

What is claimed is:

1. A reinforcing member for an optical-fiber coupler consisting essentially of:

a straight hollow protection pipe;

cylindrical heat-fusible adhesive members provided on opposite ends of said hollow protection pipe; and a heat-shrinkage tube positioned around said cylindrical heat-fusible adhesive and hollow protection pipe.

2. The reinforcing member according to claim 1 wherein said adhesive is selected from the group consisting of ethylene group copolymer resin, a low-melting point metal, hollow melting glass and wax.

3. The reinforcing member according to claim 1 wherein said pipe is constructed of quartz glass.

4. The reinforcing member according to claim 1 wherein said pipe is constructed of a material similar to quartz glass such that said material has a coefficient of linear expansion different from quartz glass wherein said difference is not greater from $1 \times 10^{-4}$.

5. The reinforcing member according to claim 1 wherein said cylindrical heat-fusible adhesive members are provided such that the heat-fusible adhesive is partially inserted on each end of said hollow pipe and the heat-shrinkage tube is positioned over each end of said hollow pipe and heat-fusible adhesive.

6. The reinforcing member according to claim 1, wherein the heat fusible adhesive fuses more rapidly than the heat shrinkage tube shrinks.

7. A reinforcing member for an optical-fiber coupler comprising:

a hollow straight protection pipe;

cylindrical heat-fusible adhesive members provided on opposite ends of said hollow protection pipe; and a heat-shrinkage tube positioned around said cylindrical heat-fusible adhesive and hollow protection pipe, wherein said adhesive is selected from the group consisting of ethylene group copolymer resin, a low-melting point metal, hollow melting glass and wax.

8. The reinforcing member according to claim 7 wherein said pipe is constructed of quartz glass.

9. The reinforcing member according to claim 7 wherein said pipe is constructed of a material similar to quartz glass such that said material has a coefficient of linear expansion different from quartz glass wherein said difference is not greater than $1 \times 10^{-4}$.

10. The reinforcing member according to claim 7 wherein said cylindrical heat-fusible adhesive members are provided such that the heat-fusible adhesive is partially inserted on each end of said hollow pipe and the heat-shrinkage tube is positioned over each end of said hollow pipe and heat-fusible adhesive.

11. A reinforcing member for an optical-fiber coupler comprising:
- a hollow protection pipe;
- cylindrical heat-fusible adhesive members provided on opposite ends of said hollow protection pipe; and
- a heat-shrinkage tube positioned around said cylindrical heat-fusible adhesive and hollow protection pipe, wherein said pipe is constructed of a material similar to quartz glass such that said material has a coefficient of linear expansion different from quartz glass wherein said difference is not greater than $1 \times 10^{-4}$.

12. A method of reinforcing an optical-fiber coupler comprising the steps of:
- inserting an optical-fiber coupler into the hollow protection pipe of a reinforcing member for an optical-fiber coupler consisting essentially of:
  - a hollow protection pipe;
  - cylindrical heat-fusible adhesive members provided on opposite ends of said hollow protection pipe; and
  - a heat-shrinkage tube positioned around said cylindrical heat-fusible adhesive and hollow protection pipe; such that a fusing portion of said coupler is disposed centrally in the axial direction of said protection pipe; and
- heating said reinforcing member with inserted coupler such that the heat-fusible adhesive is adhered and the heat-shrinkage tube is shrunk.

* * * * *